United States Patent
Murakami et al.

(10) Patent No.: US 6,655,357 B2
(45) Date of Patent: Dec. 2, 2003

(54) ABNORMALITY DETECTION APPARATUS FOR INTAKE SYSTEM OF INTERNAL COMBUSTION ENGINE

(75) Inventors: Akira Murakami, Wako (JP); Manabu Niki, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 190 days.

(21) Appl. No.: 10/032,944

(22) Filed: Oct. 19, 2001

(65) Prior Publication Data
US 2002/0096158 A1 Jul. 25, 2002

(30) Foreign Application Priority Data
Oct. 19, 2000 (JP) ........................................ 2000-318724

(51) Int. Cl.⁷ .............................................. F02D 41/22
(52) U.S. Cl. .............. 123/479; 123/198 D; 123/339.15; 73/118.2; 701/107
(58) Field of Search ..................... 73/118.2; 123/339.15, 123/339.23, 198 D, 479; 701/107

(56) References Cited

U.S. PATENT DOCUMENTS 6,041,757 A * 3/2000 Kadota ....................... 123/478

FOREIGN PATENT DOCUMENTS

| JP | 180058 | * | 7/1993 | ........... F02D/45/00 |
| JP | 47130 | * | 2/1998 | ........... F02D/41/14 |
| JP | 10-184335 | | 7/1998 | |
| JP | 10-184336 | | 7/1998 | |
| JP | 28002 | * | 1/2003 | ........... F02D/45/00 |

* cited by examiner

Primary Examiner—Tony M. Argenbright
Assistant Examiner—Hai H. Huynh
(74) Attorney, Agent, or Firm—Lahive & Cockfield, LLP (57) ABSTRACT

An abnormality detecting apparatus for an intake system of an internal combustion engine, which detects an abnormality of the intake system, is disclosed. The intake system has a throttle valve, a bypass passage bypassing the throttle valve, and an idling control valve for controlling the amount of air supplied through the bypass passage to the engine. A total intake air amount supplied to the engine is calculated. An amount of intake air supplied through the bypass passage is calculated based on a valve opening control quantity for the idling control valve. A parameter indicative of a leak air amount of the intake system is calculated according to the result of a comparison between the calculated total intake air amount and the amount of intake air supplied through the bypass passage. It is determined that the intake system is abnormal when the parameter indicative of the leak air amount is greater than a determination threshold in an engine operating condition where the throttle valve is substantially fully closed.

18 Claims, 4 Drawing Sheets

ABNORMALITY DETECTION APPARATUS FOR INTAKE SYSTEM OF INTERNAL COMBUSTION ENGINE

BACKGROUND OF THE INVENTION

The present invention relates to an abnormality detecting apparatus for an intake system of an internal combustion engine, and more particularly to an apparatus for detecting an abnormality of the intake system of the internal combustion engine which has a bypass passage bypassing a throttle valve and an idling control valve for controlling the amount of air supplied through the bypass passage.

There is a known technique of recirculating a blow-by gas that leaks from a combustion chamber of an internal combustion engine into a crankcase, to an intake system for thereby preventing the blow-by gas from being discharged into the atmosphere. Methods for detecting a leak caused by breakage or dislocation of a blow-by gas passage which recirculates a blow-by gas to the intake system are disclosed in Japanese Patent Laid-open No. 10-184335 and Japanese Patent Laid-open No. 10-184336.

Japanese Patent Laid-open No. 10-184335 discloses a method in which an idling control valve disposed in a bypass passage that bypasses a throttle valve is controlled to equalize the idling rotational speed of the engine to a predetermined rotational speed, and it is determined that the blow-by gas passage is abnormal when the opening of the idling control valve is smaller than a predetermined opening, or when an intake pressure detected during idling is higher than a predetermined pressure.

Japanese Patent Laid-open No. 10-184336 discloses a method in which the blow-by gas passage is determined to be abnormal when a pressure detected by a gas pressure sensor disposed in the blow-by gas passage becomes a value which is outside a predetermined range.

The method disclosed in Japanese Patent Laid-open No. 10-184335 determines the abnormality based on the opening of the idling control valve or the intake pressure. In other words, the method does not determine the abnormality by estimating or detecting the amount of intake air supplied to the engine. Therefore, there remains a possibility to improve accuracy of determination.

The method disclosed in Japanese Patent Laid-open No. 10-184336 is not preferable because a gas pressure sensor is additionally required, resulting in a complex configuration and an increased cost.

SUMMARY OF THE INVENTION

It is an object of the present invention to provide an abnormality detecting apparatus which is capable of more accurately determining abnormality of the intake system, including abnormality of the blow-by gas passage, with a relatively simple configuration.

According to the present invention, an abnormality detecting apparatus for an intake system of an internal combustion engine, which detects an abnormality of the intake system, is provided. The intake system has a throttle valve, a bypass passage bypassing the throttle valve, and an idling control valve for controlling the amount of air supplied through the bypass passage. The abnormality detecting apparatus comprises a first means, a second means, a third means, and an abnormality determining means. The first means calculates a total intake air amount (QTOTAL) supplied to the engine. The second means calculates an amount of intake air (QBP) supplied through the bypass passage based on a valve opening control quantity for the idling control valve. The third means calculates a parameter (QL) indicative of a leak air amount of the intake system according to the result of a comparison between the total intake air amount (QTOTAL) calculated by the first means and the amount of intake air (QBP) calculated by the second means. The abnormality determining means determines that the intake system is abnormal when the parameter (QL) calculated by the third means is greater than a determination threshold (QTH) in an engine operating condition where the throttle valve is substantially fully closed.

With this configuration, the total intake air amount supplied to the engine is calculated and the amount of intake air supplied through the bypass passage is calculated based on the valve opening control quantity for the idling control valve. Further, the parameter indicative of a leak air amount of the intake system is calculated according to the result of a comparison between the total intake air amount and the amount of intake air supplied through the bypass passage. It is determined that the intake system is abnormal when the parameter calculated by the third means is greater than a determination threshold in the engine operating condition where the throttle valve is substantially fully closed. The parameter indicative of the leak air amount corresponds to the amount of air which is other than the amount of air supplied through the bypass passage and included in the total intake air amount at the time the throttle valve is substantially fully closed. Therefore, by using this parameter, the abnormality of the intake system can be determined accurately without the need for a specific sensor for determining such abnormality.

Preferably, the abnormality determining means sets the determination threshold (QTH) according to a load on the engine (PBG).

With this configuration, the determination threshold is set according to the load on the engine. Accordingly, the abnormality of the intake system can be determined accurately even when the load on the engine changes.

Preferably, the first means includes a fuel supply amount calculating means for calculating a fuel supply amount per unit time (TI×2NE) according to an engine operating condition so that the air-fuel ratio of an air-fuel mixture supplied to the engine becomes constant, and calculates the total intake air amount (QTOTAL) based on the fuel supply amount per unit time.

Preferably, the abnormality detecting apparatus further comprises a voltage sensor for detecting an output voltage (VB) of a battery which supplies electric energy to the idling control valve, and an inhibiting means for inhibiting the abnormality determination by the abnormality determining means when the output voltage (VB) detected by the voltage sensor is lower than a predetermined voltage (VBO).

Preferably, the abnormality detecting apparatus further comprises a first average value calculating means for calculating a first average value (QTAVE) by averaging values of the total intake air amount calculated by the first means, and a second average value calculating means for calculating a second average value (QBPAVE) by averaging values of the amount of intake air calculated by the second means, wherein the third means calculates the parameter (QL) indicative of the leak air amount according to the first and second average values.

DETAILED DESCRIPTION OF THE PREFERRED EMBODIMENT

An embodiment of the present invention will be described below with reference to the drawings.

Figure 1:
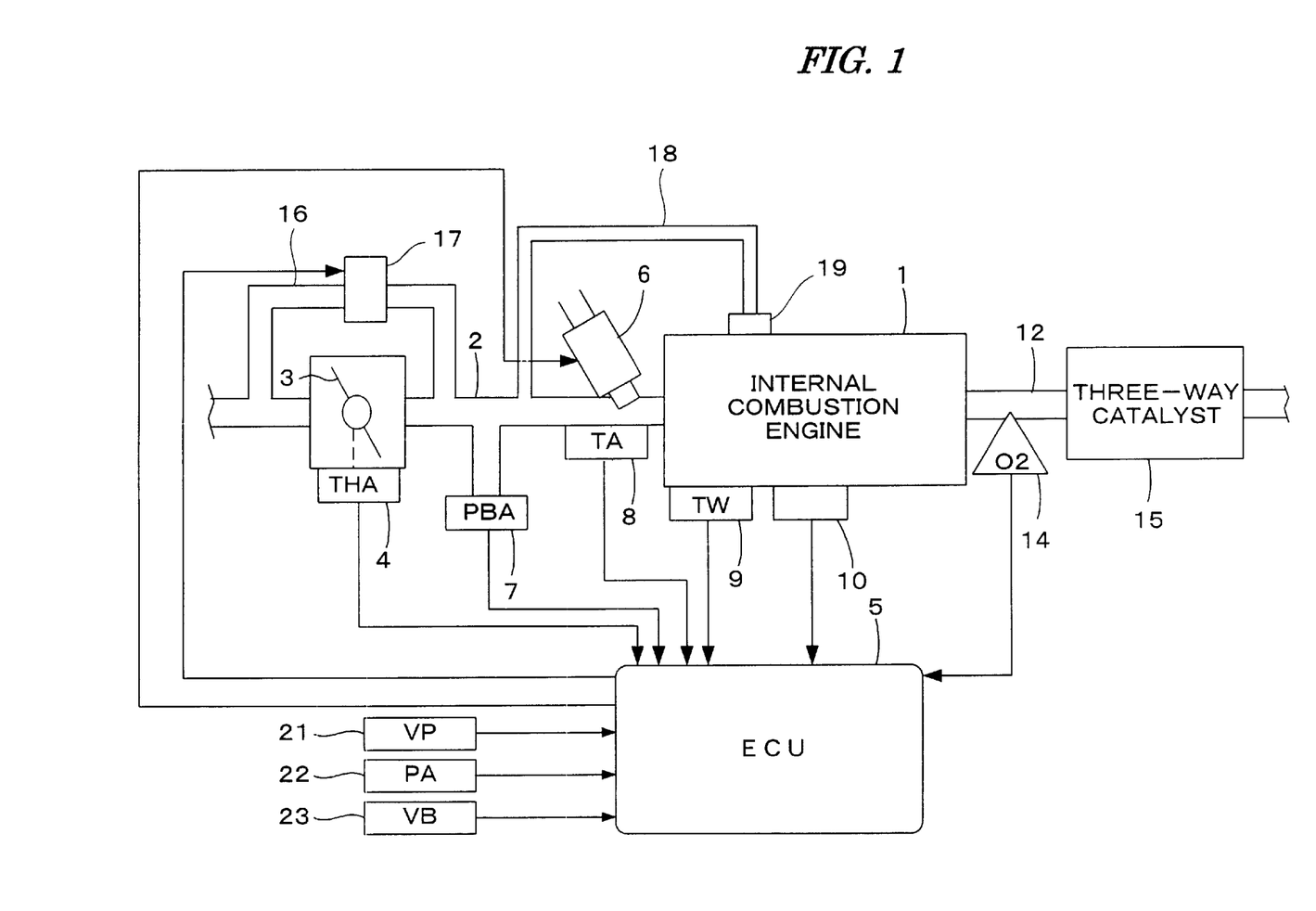
FIG. 1 is a schematic diagram showing a configuration of an internal combustion engine and a control system therefor according to an embodiment of the present invention.

FIG. 1 is a schematic diagram showing a configuration of an internal combustion engine and a control system therefor according to an embodiment of the present invention. A throttle valve 3 is disposed in an intake pipe 2 of internal combustion engine 1 (hereinafter referred to as "engine 1"). A throttle valve opening (THA) sensor 4 is connected to the throttle valve 3. The throttle valve opening sensor 4 outputs an electric signal corresponding to the opening of the throttle valve 3 and supplies the electric signal to an electronic control unit (hereinafter referred to as "ECU") 5.

A bypass passage 16 that bypasses the throttle valve 3 is connected to the intake pipe 2. In the bypass passage 16, an idling control valve 17 is provided for controlling the amount of air that is supplied through the bypass passage 16 to the engine 1. The idling control valve 17 is connected to the ECU 5. The opening amount of the idling control valve is controlled by the ECU 5.

A blow-by gas passage 18 extends between the crankcase (not shown) of the engine 1 and the intake pipe 2 for recirculating a blow-by gas that has leaked into the crankcase of the engine 1 to the intake pipe 2. A PCV (Positive Crankcase Ventilation) valve 19 is provided at a location where the blow-by gas passage 18 is connected to the crankcase.

Fuel injection valves 6, only one of which is shown, are inserted into the intake pipe 2 at locations intermediate between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9, such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) of a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

An exhaust pipe 12 of the engine 1 is provided with a three-way catalyst 15 for reducing NOx, HC, and CO contained in exhaust gases. An oxygen concentration sensor (which will be hereinafter referred to as "O2 sensor") 14 is mounted on the exhaust pipe 12 at a position upstream of the three-way catalyst 15. The O2 sensor 14 outputs an electrical signal corresponding to the oxygen concentration (air-fuel ratio) in the exhaust gases, and supplies the electrical signal to the ECU 5.

A vehicle speed sensor 21, an atmospheric pressure sensor 22, and a battery voltage sensor 23 are connected to the ECU 5. The vehicle speed sensor detects the running speed (vehicle speed) VP of a vehicle that is driven by the engine 1. The atmospheric pressure sensor 22 detects an atmospheric pressure PA. The battery voltage sensor 23 detects the output voltage VB of a battery (not shown) which supplies electric energy to the ECU 5, the idling control valve 17, and the like. Detected signals from these sensors are supplied to the ECU 5.

The ECU 5 includes an input circuit having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU"), a memory circuit including a ROM (read only memory) preliminarily stores various operational programs to be executed by the CPU, and a RAM (random access memory) for storing the results of computation or the like by the CPU, and an output circuit for supplying drive signals to the fuel injection valves 6, the idling control valve 17, and the like.

The CPU of the ECU 5 determines various engine operating conditions based on the above various engine operating parameter signals, and calculates a fuel injection period TOUT of the fuel injection valve 6 that is opened in synchronism with TDC signal pulses, according to the determined engine operating conditions from the following equation (1).

$$TOUT = TIM \times KO2 \times K1 + K2 \qquad (1)$$

In the above equation, TIM represents a basic fuel injection period of the fuel injection valves 6 which is determined by retrieving a TI map that is set according to the engine rotational speed NE and the absolute intake pressure PBA. The TI map is set so that the air-fuel ratio of an air-fuel mixture supplied to the engine 1 substantially becomes the stoichiometric air-fuel ratio in an operating condition corresponding to the engine rotational speed NE and the absolute intake pressure PBA on the map.

In the above equation, KO2 represents an air-fuel ratio correcting coefficient that is calculated according to the detected value of the O2 sensor 14 to make the air-fuel ratio coincide with the stoichiometric air-fuel ratio. The air-fuel ratio correcting coefficient KO2 is set to 1.0 (non-correcting value) in an operating condition, such as a condition immediately after the starting of the engine 1, where the air-fuel ratio feedback control based on the output signal of the O2 sensor 14 is not carried out.

In the above equation, K1 and K2 respectively represent another correcting coefficient and a correcting variable which are calculated according to the various engine parameter signals. The correcting coefficient K1 and the correcting variable K2 are set to such values that optimize the various characteristics including fuel consumption characteristics and engine acceleration characteristics according to the engine operating condition.

The CPU in the ECU 5 calculates a valve opening control quantity ICMD for controlling the opening of the idling control valve 17 according to the engine operating condition, and supplies a drive signal depending on the valve opening control quantity ICMD to the idling control valve 17. The CPU in the ECU 5 calculates the valve opening control quantity ICMD from the equation (2) given below. The amount of intake air of the engine 1 through the idling control valve 17 is substantially-proportional to the valve opening control quantity ICMD.

$$ICMD = (IFB + ILOAD) \times KIPA + IPA \tag{2}$$

In the above equation, IFB represents a correcting term for an idling target rotational speed control (proportional, integral, and differential control) which is set to equalize the idling rotational speed of the engine 1 to a target rotational speed. ILOAD represents a load correcting term which is set according to whether an electric load on the engine 1, a compressor load of an air-conditioner, a power steering load, etc. are turned on or off, or whether or not an automatic transmission is in an in-gear condition where the shift position is in the ranges other than the parking position or the neutral position. KIPA and IPA respectively represent an atmospheric pressure correcting coefficient and an atmospheric pressure correcting term that are set according to the atmospheric pressure PA.

The ECU 5 supplies a drive signal based on the fuel injection period TOUT determined as described above to each of the fuel injection valves 6, and also supplies a drive signal based on the valve opening control quantity ICMD to the idling control valve 17.

Figure 2:
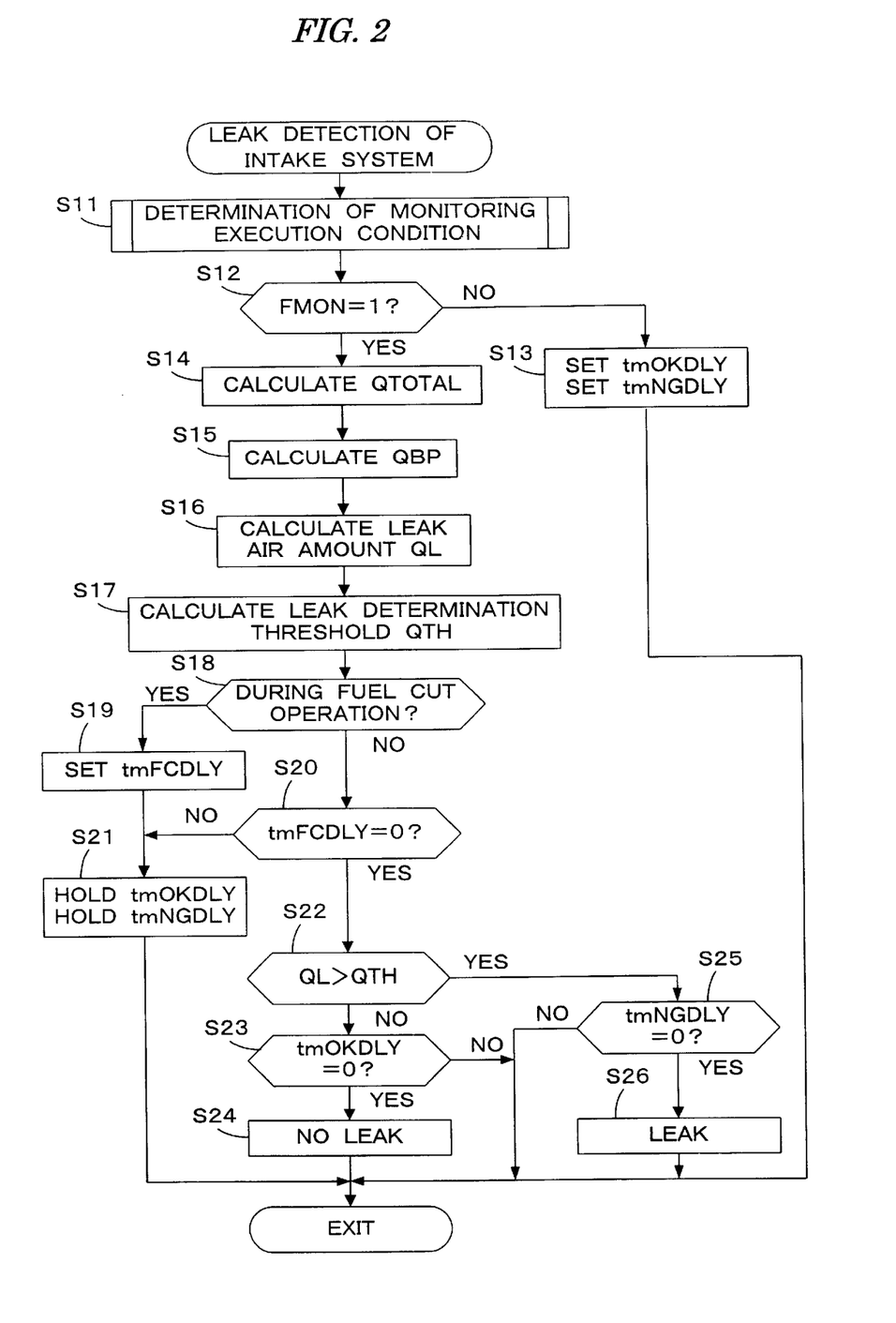
FIG. 2 is a flowchart showing a process for detecting a leak in an intake system.

FIG. 2 is a flowchart showing a process for detecting an abnormality (leak) of the intake system of the engine 1. The process is carried out by the CPU in the ECU 5 in synchronism with TDC signal pulses.

In step S11, the CPU executes a process (FIG. 4) of determining a monitoring execution condition, i.e., a condition to execute the abnormality detection of the intake system. In the process of determining the monitoring execution condition, a monitoring flag FMON is set. The flag FMON is set to "1" when the monitoring execution condition is satisfied. In order to satisfy the monitoring execution condition, it is at least required that the throttle valve 3 is substantially fully closed.

In step S12, it is determined whether or not the monitoring flag FMON is "1". If FMON is "0", indicating that the monitoring execution condition is not satisfied, a downcount timer tmOKDLY, which is referred to in step S23, and a downcount timer tmNGDLY, which is referred to in step S25, are set respectively to a predetermined delay time TMOKDLY (e.g., 5 seconds) and a predetermined delay time TMNGDLY (e.g., 5 seconds) and started (step S13). Then, the process immediately ends.

If FMON is "1", indicating that the monitoring execution condition is satisfied, a total intake air amount QTOTAL is calculated from the following equations (3), (4), and (5) (step S14):

$$QTOTAL = TIM \times 2NE \times KC / \sigma A \tag{3}$$

$$KC = KTQ \times \sigma G \times 14.7 \tag{4}$$

$$\sigma = [1.293/(1+0.00367 TA)] \times (PA/PA0) \tag{5}$$

In the equation (3), TIM represents the basic fuel injection period which is applied to the equation (1). KC represents a coefficient that is calculated from the equation (4), for converting the basic fuel injection period TIM into an intake air amount (weight). σA represents the density of air.

As described above, since the basic fuel injection period TIM is set depending on the intake air amount to equalize the air-fuel ratio to the stoichiometric air-fuel ratio, TIM has a value proportional to the intake air amount per combustion cycle. Therefore, the fuel injection period is converted into an intake air amount (weight) per combustion cycle by multiplying the basic fuel injection period TIM by the coefficient KC. An intake air amount (weight) per unit time is obtained by multiplying the intake air amount (weight) per combustion cycle by twice the engine rotational speed NE (two fuel injections per revolution are carried out for the four-cylinder engine). An intake air amount (liters/min.) as a volumetric rate per unit of time is obtained by dividing the intake air amount (weight) per unit of time by the density GA of air. As for the six-cylinder engine, "2NE" in the equation (3) is changed to "3NE", since three fuel injections per revolution are carried out for the six-cylinder engine. As for the eight-cylinder engine, "2NE" in the equation (3) is changed to "4NE", since four fuel injections per revolution are carried out for the six-cylinder engine. In general, as for the k-cylinder engine (k is an integer that is greater than or equal to "1"), "2NE" in the equation (3) is changed to "(k/2)NE", since k/2 fuel injections per revolution are carried out for the k-cylinder engine.

In the equation (4), KTQ represents a coefficient for converting the fuel injection period into a fuel amount (volume), σG is the density of fuel, and 14.7 is the stoichiometric air-fuel ratio. (TIM×KTQ) represents the fuel amount (volume) per combustion cycle. A fuel amount (weight) per combustion cycle is obtained by multiplying the fuel amount (volume) per combustion cycle by the density σG of fuel. A corresponding intake air amount (weight) is obtained by multiplying the fuel amount (weight) per combustion cycle by the stoichiometric air-fuel ratio 14.7.

In the equation (5), TA represents a detected intake air temperature (°C.), PA represents a detected atmospheric pressure, and PAO is a reference atmospheric pressure (=101.3 kPa).

In step S15, an amount of air (hereinafter referred to as "bypassing air amount") QBP that is supplied to the engine 1 through the idling control valve 17 (bypass passage 16) is calculated from the following equation (6).

$$QBP = ICMD \times KIQ \tag{6}$$

where KIQ represents a coefficient for converting the valve opening control quantity ICMD for the idling control valve 17 into a bypassing air amount QBP.

In step S16, the bypassing air amount QBP is subtracted from the total intake air amount QTOTAL, thus calculating a leak air amount QL which corresponds to an intake air amount due to, for example, a dislocation of the blow-by gas passage 18. The steps following step S16 are carried out, when at least a condition that the throttle valve 3 is substantially fully closed is satisfied. Accordingly, the intake air amount supplied through the throttle valve 3 is very small. Therefore, the leak air amount QL can be obtained by subtracting the bypassing air amount QBP from the total intake air amount QTOTAL.

Figure 3:
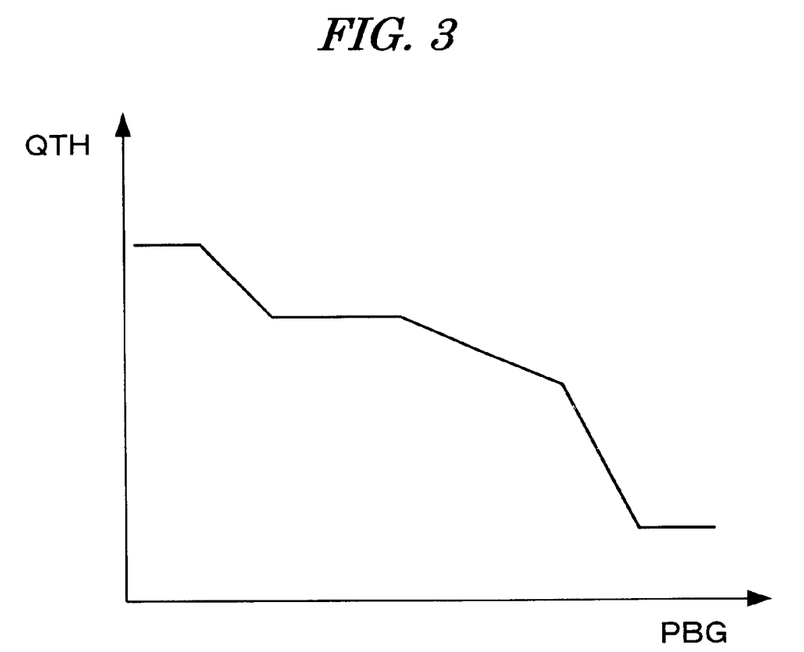
FIG. 3 shows a table used in the process shown in FIG. 2.

In step S17, a QTH table shown in FIG. 3 is retrieved according to a gage pressure PBG (PBA-PA), thus calculating a leak determination threshold QTH. The QTH table is set so that the leak determination threshold QTH decreases as the gage pressure PGB becomes higher (as the engine load increases).

In step S18, it is determined whether or not the fuel cut operation in which the fuel supply to the engine 1 is interrupted is carried out. If the fuel cut operation is carried out, a downcount timer tmFCDLY, which measures a time period after the fuel supply to the engine 1 is resumed, is set to a predetermined time TMFCDLY (e.g., 2 seconds), and started (step S19). Then, the timers tmOKDLY and tmNGDLY, which have been started in step S13, are kept unchanged (the countdown operation of the timers tmOKDLY and tmNGDLY are stopped) (step S21). Thereafter the process ends.

If the fuel cut operation is not carried out, it is determined whether or not the value of the timer tmFCDLY is "0" in step S20. If tmFCDLY is greater than "0", the process proceeds to step S21. If tmFCDLY is "0", it is determined whether or not the leak air amount QL calculated in step S16 is greater than the leak determination threshold QTH calculated in step S17 (step S22). If QL is less than or equal to QTH, it is determined whether or not the value of the timer tmOKDLY is "0" (step S23). If tmOKDLY is greater than "0", the process immediately ends. If tmOKDLY is "0", it is determined that there is no leak in the intake system (step S24).

If QL is greater than QTH in step S22, it is determined whether or not the value of the timer tmNGDLY is "0" (step S25). If tmNGDLY is greater than "0", the process immediately ends. If tmNGDLY is "0", it is determined that there is a leak in the intake system (step S26). When it is determined that there is a leak in the intake system, a warning indication is given with a lamp or a warning sound is output, to inform the driver of the leak in the intake system.

According to the process shown in FIG. 2, as described above, if the monitoring execution condition is satisfied, the total intake air amount QTOTAL and the bypassing air amount QBP which is supplied through the bypass passage 16 are calculated, and the leak air amount QL (QTOTAL–QBP), which is the difference between the total intake air amount QTOTAL and the bypassing air amount QBP, is calculated. If the leak air amount QL is greater than the leak determination threshold QTH, it is determined that there is a leak in the intake system. Therefore, it is possible to determine whether or not a leak exists in the intake system more accurately, compared with the case that the determination is carried out based on the intake pressure or the opening of the idling control valve as is in the conventional apparatus.

Inasmuch as the leak determination threshold QTH is set according to the gage pressure PGB, i.e. the load on the engine 1, it is possible to carry out the leak determination accurately even when the load on the engine 1 is changing.

Figure 4:
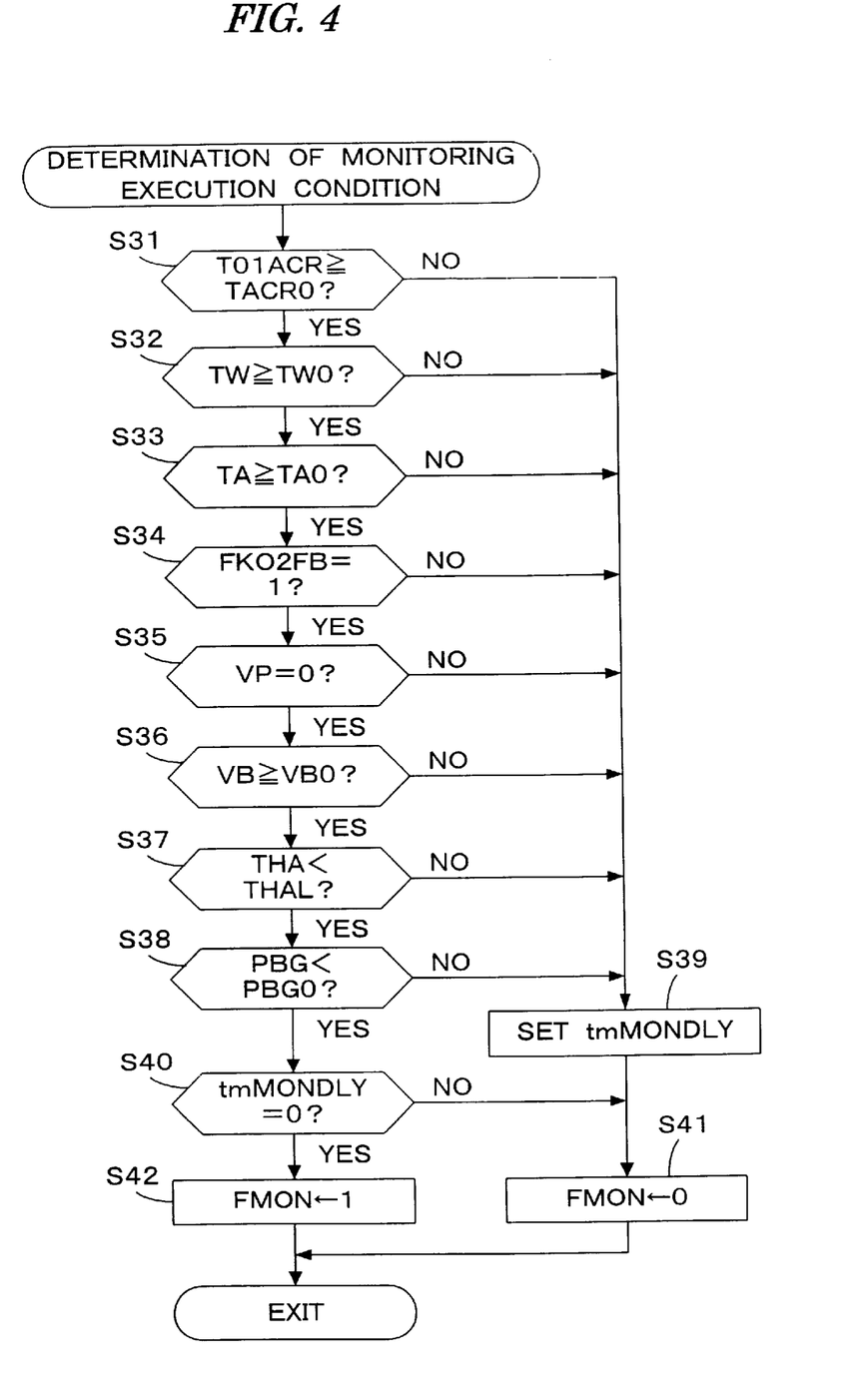
FIG. 4 is a flowchart showing a process, which is carried out in step S11 shown in FIG. 2, for determining a monitoring execution condition.

FIG. 4 is a flowchart showing a process for determining the monitoring execution condition. This process is carried out in step S11 shown in FIG. 2.

In step S31, it is determined whether or not the value of an upcount timer T01ACR which measures a time period after the completion of the starting of the engine 1 is equal to or larger than a predetermined time TACR0 (e.g., 15 seconds). In step S32, it is determined whether the engine coolant temperature TW is equal to or higher than a predetermined coolant temperature TW0 (e.g., 70° C.). In step S33, it is determined whether the intake air temperature TA is equal to or higher than a predetermined intake air temperature TA0 (e.g., −7° C.). In step S34, it is determined whether a feedback control flag FKO2FB is set to "1". The flag FKO2FB is set to "1" when the air-fuel ratio correcting coefficient KO2 is normally changing in the vicinity of "1.0", which indicates that the air-fuel ratio correcting coefficient KO2 is not sticking to a predetermined upper limit value or a predetermined lower limit value. In step S35, it is determined whether the vehicle speed VP is "0". In step S36, it is determined whether the battery voltage VB is equal to or higher than a predetermined voltage VB0 (e.g., 10.5 V). In step S37, it is determined whether the throttle valve opening THA is less than a predetermined opening THAL (e.g., 0.1 degree), i.e., whether the throttle valve 3 is substantially fully closed. In step S38, it is determined whether the gage pressure PBG is lower than a predetermined gage pressure PBG0 (e.g., −6.7 kPa (−50 mmHg)).

If the answer to any of steps S31 through S38 is negative (NO), a downcount timer tmMONDLY is set to a predetermined time TMMONDLY (e.g., 2 seconds) and started (step S39). Next, the monitoring flag FMON is set to "0" (step S41). Thereafter the process ends.

If the answers to all of steps S31 through S38 are affirmative (YES), it is determined whether or not the value of the timer tmMONDLY started in step S39 is "0" (step S40). If tmMONDLY is greater than "0", the process goes to step S41. If tmMONDLY is "0", it is determined that the monitoring execution condition is satisfied and the monitoring flag FMON is set to "1" (step S42). Thereafter the process ends.

According to the process shown in FIG. 4, as described above, when the engine 1 is idling with the throttle valve 3 being substantially fully closed after completion of the warming-up of the engine 1, a monitoring execution condition is satisfied if the conditions with respect to the intake air temperature TA, the battery voltage VB, and the like, are satisfied. Step S36 is provided because the actual opening of the idling control valve 17 controlled by the valve opening control quantity ICMD decreases, if the battery voltage VB decreases.

In the present embodiment, the ECU 5 constitutes a first means, a second means, a third means and an abnormality determining means. Specifically, steps S14, S15, and S16 shown in FIG. 2 correspond respectively to the first means, the second means, and the third means. Steps S17 through S26 correspond to the abnormality determining means. The ECU 5 also constitutes a first module, a second module, a third module and an abnormality determining module. Specifically, steps S14, S15, and S16 shown in FIG. 2 correspond respectively to the first module, the second module, and the third module. Steps S17 through S26 correspond to the abnormality determining module.

The present invention is not limited to the above embodiment, but may be modified in various ways. In the above embodiment, the leak air amount QL is calculated using the total intake air amount QTOTAL and the bypassing air amount QBP which are calculated each time the process shown in FIG. 2 is executed. The leak air amount QL may be calculated as follows.

A weighted average values QTAVE of the total intake air amount QTOTAL and a weighted average value QBPAVE of the bypassing air amount QBP are calculated from the following equations (7) and (8). Then, the leak air amount QL is calculated from the following equation (9).

$$QTAVE = A \times QTOTAL + (1-A) \times QTAVE \quad (7)$$

$$QBPAVE = A \times QBP + (1-A) \times QBPAVE \quad (8)$$

$$QL = QTAVE - QBPAVE \quad (9)$$

On the right sides of the equations (7) and (8), QTAVE and QBPAVE represent the weighting average values that are calculated in the preceding calculation cycle, and "A" represents a weighting coefficient set to a value between "0" and "1".

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An abnormality detecting apparatus for an intake system of an internal combustion engine, which detects an abnormality of said intake system, said intake system having a throttle valve, a bypass passage bypassing said throttle valve, and an idling control valve for controlling the amount of air supplied through the bypass passage to said engine, said abnormality detecting apparatus comprising:

first means for calculating a total intake air amount supplied to said engine;

second means for calculating an amount of intake air supplied through said bypass passage based on a valve opening control quantity for said idling control valve;

third means for calculating a parameter indicative of a leak air amount of said intake system according to the result of a comparison between the total intake air amount calculated by said first means and the amount of intake air calculated by said second means; and abnormality determining means for determining that said intake system is abnormal when the parameter calculated by said third means is greater than a determination threshold in an engine operating condition where said throttle valve is substantially fully closed.

2. An abnormality detecting apparatus according to claim 1, wherein said abnormality determining means sets the determination threshold according to a load on said engine.

3. An abnormality detecting apparatus according to claim 1, wherein said first means includes fuel supply amount calculating means for calculating a fuel supply amount per unit time according to an engine operating condition so that the air-fuel ratio of an air-fuel mixture supplied to said engine becomes constant, and calculates the total intake air amount based on the fuel supply amount per unit time.

4. An abnormality detecting apparatus according to claim 1, further comprising a voltage sensor for detecting an output voltage of a battery which supplies electric energy to said idling control valve, and inhibiting means for inhibiting the abnormality determination by said abnormality determining means when the output voltage detected by said voltage sensor is lower than a predetermined voltage.

5. An abnormality detecting apparatus according to claim 1, further comprising first average value calculating means for calculating a first average value by averaging values of the total intake air amount calculated by said first means, and second average value calculating means for calculating a second average value by averaging values of the amount of intake air calculated by said second means, wherein said third means calculates the parameter indicative of the leak air amount according to the first and second average values.

6. An abnormality detecting apparatus according to claim 1, further comprising a sensor for detecting an engine coolant temperature of said engine, a sensor for detecting an intake air temperature of said engine, an oxygen concentration sensor provided in an exhaust system of said engine for detecting an oxygen concentration in the exhaust gases, a sensor for detecting a speed of a vehicle driven by said engine, and inhibiting means for inhibiting the abnormality determination by said abnormality determining means when at least one of the following conditions is not satisfied:

1) a predetermined time period has elapsed from the completion of staring of said engine;

2) the detected engine coolant temperature is higher than or equal to a predetermined coolant temperature;

3) the detected intake air temperature is higher than or equal to a predetermined intake air temperature;

4) an air-fuel ratio feedback control according to the output of said oxygen concentration sensor is normally performed; and 5) the detected vehicle speed is substantially zero.

7. An abnormality detecting apparatus for an intake system of an internal combustion engine, which detects an abnormality of said intake system, said intake system having a throttle valve, a bypass passage bypassing said throttle valve, and an idling control valve for controlling the amount of air supplied through the bypass passage to said engine, said abnormality detecting apparatus comprising:

first module for calculating a total intake air amount supplied to said engine;

second module for calculating an amount of intake air supplied through said bypass passage based on a valve opening control quantity for said idling control valve;

third module for calculating a parameter indicative of a leak air amount of said intake system according to the result of a comparison between the total intake air amount calculated by said first module and the amount of intake air calculated by said second module; and abnormality determining module for determining that said intake system is abnormal when the parameter calculated by said third module is greater than a determination threshold in an engine operating condition where said throttle valve is substantially fully closed.

8. An abnormality detecting apparatus according to claim 7, wherein said abnormality determining module sets the determination threshold according to a load on said engine.

9. An abnormality detecting apparatus according to claim 7, wherein said first module includes fuel supply amount calculating module for calculating a fuel supply amount per unit time according to an engine operating condition so that the air-fuel ratio of an air-fuel mixture supplied to said engine becomes constant, and calculates the total intake air amount based on the fuel supply amount per unit time.

10. An abnormality detecting apparatus according to claim 7, further comprising a voltage sensor for detecting an output voltage of a battery which supplies electric energy to said idling control valve, and inhibiting module for inhibiting the abnormality determination by said abnormality determining module when the output voltage detected by said voltage sensor is lower than a predetermined voltage.

11. An abnormality detecting apparatus according to claim 7, further comprising first average value calculating module for calculating a first average value by averaging values of the total intake air amount calculated by said first module, and second average value calculating module for calculating a second average value by averaging values of the amount of intake air calculated by said second module, wherein said third module calculates the parameter indicative of the leak air amount according to the first and second average values.

12. An abnormality detecting apparatus according to claim 7, further comprising a sensor for detecting an engine coolant temperature of said engine, a sensor for detecting an intake air temperature of said engine, an oxygen concentration sensor provided in an exhaust system of said engine for detecting an oxygen concentration in the exhaust gases, a sensor for detecting a speed of a vehicle driven by said engine, and an inhibiting module for inhibiting the abnormality determination by said abnormality determining module when at least one of the following conditions is not satisfied:

1) a predetermined time period has elapsed from the completion of staring of said engine;
2) the detected engine coolant temperature is higher than or equal to a predetermined coolant temperature;
3) the detected intake air temperature is higher than or equal to a predetermined intake air temperature;
4) an air-fuel ratio feedback control according to the output of said oxygen concentration sensor is normally performed; and
5) the detected vehicle speed is substantially zero.

13. An abnormality detecting method for an intake system of an internal combustion engine, in which an abnormality of said intake system is detected, said intake system having a throttle valve, a bypass passage bypassing said throttle valve, and an idling control valve for controlling the amount of air supplied through the bypass passage to said engine, said abnormality detecting method comprising the steps of:

a) calculating a total intake air amount supplied to said engine;
b) calculating an amount of intake air supplied through said bypass passage based on a valve opening control quantity for said idling control valve;
c) calculating a parameter indicative of a leak air amount of said intake system according to the result of a comparison between the total intake air amount calculated at step a) and the amount of intake air calculated at step b); and
d) determining that said intake system is abnormal when the parameter calculated at step c) is greater than a determination threshold in an engine operating condition where said throttle valve is substantially fully closed.

14. An abnormality detecting method according to claim 13, wherein the determination threshold is set according to a load on said engine.

15. An abnormality detecting method according to claim 13, wherein the step a) includes the step of calculating a fuel supply amount per unit time according to an engine operating condition so that the air-fuel ratio of an air-fuel mixture supplied to said engine becomes constant, and the total intake air amount is calculated based on the calculated fuel supply amount per unit time.

16. An abnormality detecting method according to claim 13, further comprising the steps of detecting an output voltage of a battery which supplies electric energy to said idling control valve, and inhibiting the abnormality determination when the detected output voltage of the battery is lower than a predetermined voltage.

17. An abnormality detecting method according to claim 13, further comprising the steps of calculating a first average value by averaging values of the total intake air amount calculated at step a), and calculating a second average value by averaging values of the amount of intake air calculated at step b), wherein the parameter indicative of the leak air amount is calculated according to the first and second average values.

18. An abnormality detecting method according to claim 13, further comprising the steps of detecting an engine coolant temperature of said engine, detecting an intake air temperature of said engine, detecting an oxygen concentration in the exhaust gases of said engine, detecting a speed of a vehicle driven by said engine, and inhibiting the abnormality determination when at least one of the following conditions is not satisfied:

1) a predetermined time period has elapsed from the completion of staring of said engine;
2) the detected engine coolant temperature is higher than or equal to a predetermined coolant temperature;
3) the detected intake air temperature is higher than or equal to a predetermined intake air temperature;
4) an air-fuel ratio feedback control according to the detected oxygen concentration is normally performed; and
5) the detected vehicle speed is substantially zero.

* * * * *

UNITED STATES PATENT AND TRADEMARK OFFICE
CERTIFICATE OF CORRECTION

PATENT NO. : 6,655,357 B2
DATED : December 2, 2003
INVENTOR(S) : Murakami et al.

It is certified that error appears in the above-identified patent and that said Letters Patent is hereby corrected as shown below:

Column 6,
Line 12, replace "σ =" with -- σA =";
Lines 32-33, replace "density GA of air." with -- density σA of air.";

Column 9,
Line 1, replace "average valves QTAVE" with -- average valve QTAVE --;

Column 10,
Line 24, replace "of staring of said" with -- of starting of said --;

Column 11,
Line 24, replace "of staring of said" with -- of starting of said --;

Column 12,
Line 41, replace "of staring of said" with -- of starting of said --.

Signed and Sealed this

Fifth Day of October, 2004

JON W. DUDAS
*Director of the United States Patent and Trademark Office*